(12) United States Patent
Mehta et al.

(10) Patent No.: US 12,177,176 B1
(45) Date of Patent: Dec. 24, 2024

(54) TRIAGING INCOMING INFORMATION IN A CARD-BASED MOBILE INTERFACE

(71) Applicant: Salesforce, Inc., San Francisco, CA (US)

(72) Inventors: Siddhant Mehta, Toronto (CA); Naman Kedia, San Francisco, CA (US); Akshay Bakshi, New York, NY (US); Jon Chmura, Truckee, CA (US); Priyank Aranke, San Francisco, CA (US); Prajna Shetty, San Francisco, CA (US); Josh Stagg, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/384,246

(22) Filed: Oct. 26, 2023

(51) Int. Cl.
| | |
|---|---|
| *H04L 51/21* | (2022.01) |
| *G06F 3/04883* | (2022.01) |
| *G06F 16/33* | (2019.01) |
| *G06F 16/34* | (2019.01) |

(52) U.S. Cl.
CPC .......... *H04L 51/21* (2022.05); *G06F 3/04883* (2013.01); *G06F 16/3334* (2019.01); *G06F 16/345* (2019.01)

(58) Field of Classification Search
CPC ...................................................... H04L 51/21
See application file for complete search history.

(56) References Cited

U.S. PATENT DOCUMENTS

| | | | | |
|---|---|---|---|---|
| 9,913,114 B1* | 3/2018 | Wu | ......................... | G06T 11/60 |
| 11,184,471 B2* | 11/2021 | Vaananen | ............. | H04W 4/024 |
| 11,956,186 B2* | 4/2024 | Rubadeau | ............... | G06F 40/35 |
| 2009/0043860 A1* | 2/2009 | Aoki | .................... | G06Q 10/107 |
| | | | | 709/206 |
| 2013/0159877 A1* | 6/2013 | Banti | ................... | G06Q 10/107 |
| | | | | 715/752 |
| 2015/0113436 A1* | 4/2015 | Penha | .................. | G06F 3/0482 |
| | | | | 715/752 |

(Continued)

FOREIGN PATENT DOCUMENTS

WO  WO-2016170402 A1 *  10/2016  ........... G06F 3/0481

*Primary Examiner* — Philip C Lee
(74) *Attorney, Agent, or Firm* — Sterne, Kessler, Goldstein & Fox P.L.L.C.

(57) ABSTRACT

Disclosed herein are system, method, and device embodiments for creating an improved mobile interface of a messaging application. The mobile interface displays unread conversations as a stack of tiles. With the top tile displayed, a user may efficiently mark the conversation as read or unread by swiping left or right. The interface then moves to the next tile in the stack. This allows a user to quickly triage unread messages while in the mobile application. The mobile interface ranks unread messages in an intuitive fashion in determining the ordering of the tiles. The interface may generate these rankings using a trained artificial intelligence based on a user's past behaviors and signals in unread messages. Messages received during the user's review of the stack of tiles may be dynamically inserted in a thoughtful manner. A summary may be displayed that indicates the number of messages, an estimated time to complete the review of the unread messages, and a summary of the unread messages that may be generated by sending a generative pre-trained transformer prompt to a trained neural network.

20 Claims, 7 Drawing Sheets

(56) References Cited

U.S. PATENT DOCUMENTS

| | | | |
|---|---|---|---|
| 2016/0182430 A1* | 6/2016 | Sachidanandam | G06Q 10/107 715/752 |
| 2019/0065615 A1* | 2/2019 | Room | G06F 16/954 |
| 2023/0177256 A1* | 6/2023 | Danducci, II | G06N 3/045 715/254 |

* cited by examiner

TRIAGING INCOMING INFORMATION IN A CARD-BASED MOBILE INTERFACE

BACKGROUND

Organizations deploy and leverage messaging applications that allow users to exchange text and voice messages. Messaging applications may support file sharing, @mentions, and voice/video calls, integrate with other software tools, and provide a wide range of ancillary features. Often these messaging applications become a central hub of organizational activity.

Users of messaging applications may send and receive one-to-many messages via channels. A channel may represent a working group of individuals organized around a project, topic, team, or other common goal. Channels may be public or private. All messages in a public channel may be viewable and searchable by all members of an organization's workspace. In a private channel, only members may search and view messages.

Users may send and receive one-to-one messages-referred to as direct messages ("DMs"). Messaging applications may rely on an Internet Relay Chat ("IRC") or similar application layer protocol to facilitate message exchanges. The messaging application may provide a graphical user interface ("GUI") via which users receive and send messages, configure channels and groups, and otherwise harness the messaging application's functionality.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for creating an improved mobile interface of a messaging application. The mobile interface displays unread conversations in a stack of tiles. Each conversation corresponds to one tile. With the top tile displayed, a user may efficiently mark the conversation as read or unread by swiping left or right. The interface then moves to the next tile in the stack. This allows a user to quickly triage unread messages while in the mobile application.

Messaging applications generate graphical user interfaces through which users may view received messages, create new messages, configure channels and groups, and perform other suitable tasks. Messages may be sent/received in channels, as DMs, or using other suitable mechanisms. Such messages and subsequent replies will be collectively referred to below as conversations.

Users may access messaging applications from desktop computers and mobile devices. This propensity gives rise to two distinct design paradigms for messaging applications: desktop v. mobile.

In a desktop setting, usage scenarios typically involve longer periods of focused work. Users may keep a messaging application open for extended periods of time—e.g., a user may open the messaging application on their desktop computer when they log in and keep the application open in the background throughout a day's work. The user may engage with the messaging application throughout this session, sending messages to colleagues, receiving and replying to messages, and performing other suitable tasks in the messaging application. The user may address problems and generate work product throughout the session, perhaps employing other software tools installed on the desktop computer, making phone calls, talking to coworkers, etc. with the messaging application running.

Desktop usage scenarios lend themselves to a particular design methodology for building a desktop interface. For example, an exemplary desktop interface of a messaging application may list conversations, channels, threads, etc., on the left of the screen space in a frame or region. The messaging application may track conversations having unread messages that the user has not viewed. The desktop interface may inform the user about the number of conversations having unread messages. A user may click a conversation to engage with, and the desktop interface may display the conversation in a centered location in the screen. This allows the user to intently focus on one conversation at a time. In the desktop scenario, the user decides which conversation to concentrate on at any given time, with appropriate visual cues and search functionality provided to aid the user's decision.

Different usage scenarios arise in the mobile setting. In a mobile usage scenario, the median session length is under 30 seconds, with users engaging in abridged sessions more frequently throughout the day. For example, a user may view their mobile device while commuting in the morning, at lunch, after work, waiting in a line, during a commercial break, etc. These short sessions may occur dozens or hundreds of times throughout the day.

Because mobile sessions are shorter than desktop sessions, users want to get things done faster and often perform different tasks than when operating in a desktop interface. For instance, a user may triage unread messages while in the mobile interface. Triaging may involve a user determining that a message requires further review at a later point when the user returns to a desktop interface. A user may review a message and/or provide a quick response but leave the message marked as "unread" to be reminded of the message upon returning to a desktop environment. For messages that are irrelevant or otherwise do not require further review, a user may mark the message or conversation as "read."

In general, users are overwhelmed by the sheer number of received messages. Unread messages may or may not be relevant to the user, and reviewing updated conversations may present significant overhead and management headaches. Conversations may or may not require input and/or action. Ideal mobile application design allows users to quickly perform the "4 D's of Time Management"—"do, defer, delegate, and delete." For example, a user may "defer" some tasks for later by marking a message as unread (or by implication by marking other messages as read), "do" some tasks by completing work via their mobile device, "delegate" some tasks by forwarding messages, and "delete" some messages by either actually deleting them or marking them as read.

Users may use a mobile interface and a desktop interface in tandem, conducting long periods of focused work in a desktop setting while triaging received conversations while in a mobile setting. Thus, a further technical benefit may be realized by optimizing the interplay between the desktop and mobile interfaces. Because the user may effectively triage unread messages in the mobile interface, upon returning to the desktop interface, less managerial responsibility remains for the user. The user may best leverage the focused-work aspects of the desktop interface.

No legacy technique or system provides a solution that allows users to quickly and efficiently triage their messages in accordance with these mobile design principles. While legacy approaches may allow users to mark messages as read/unread, existing mobile interfaces are deficient because the interfaces involve multiple taps, creating a time consuming and laborious process for a user. A user must first open the channel from the list/sidebar, scroll/read/reply, tap a back button, and then choose the next channel. This progression involves multiple extra steps and requires the user to perform the extra cognitive choice of which determining which conversation to review in each iteration.

Accordingly, a need exists to remove navigational inefficiencies from a mobile interface when a user triages unread messages. By displaying conversations having unread messages as a stack of tiles, the mobile interface allows a user to mark a conversation as read or unread by swiping left or right. Each conversation having an unread message is displayed as a separate tile. The user may scroll a top tile up and down to read the full conversation. The user may send a reply message in the conversation. But merely by dragging the top tile to the left or right, the user may mark the conversation as read or unread and move on to the next tile in the stack of tiles.

However, this technique puts the onus on the software to determine an order in which to display the tiles. As discussed above, a desktop interface allows a user to select the conversation to focus on. But when displaying the stack of tiles, the revamped mobile interface must decide the first tile to display, the second tile to display, etc., in an manner that anticipates the order that the user would want to review unread messages in. This reduces the user's cognitive effort but increases the responsibilities of the mobile interface. Accordingly, a need exists to rank unread messages in an intuitive fashion.

Accordingly, a further technical benefit may be realized by training an artificial intelligence with signals that reflect user behavior. To derive an intelligent ranking of the tiles, the trained artificial intelligence may be fed the unread conversations. For example, the user may direct their attention more frequently to messages within certain channels, and these channels may be prioritized over other channels in determining the tiles' rankings. For another example, the artificial intelligence may be trained based on the particular user's behavior over time in marking certain messages read/unread, and the rankings may be more likely to display messages likely to be marked as read by the user first allowing the user to rapidly mark messages as read. Conversely, the messages most likely to be marked as unread may also be displayed first if the user is likely to want to review messages of likely importance in the mobile interface. In some embodiments, a user may toggle between the two approaches. The artificial intelligence may learn to prioritize messages from certain individuals over messages from other individuals and displayed higher in the stack of tiles. The artificial intelligence may be trained with organization chart data to determine the user's supervisor and/or team members and prioritize messages from these individuals.

The technique of triaging messages using a stack of tiles creates an additional need, namely, how to process unread messages received after displaying an initial stack of tiles. A new, unread message may arrive while the user works through the originally displayed stack of tiles. Accordingly, a need exists to dynamically insert messages into the stack of tiles. A technical benefit may be realized by inserting the messages in a manner that still presents the conversations in a relevant and thoughtful order without being overly intrusive or unduly interrupting the user's flow in reviewing the initial stack of tiles.

In one embodiment, rankings may be dynamically recalculated on the fly as unread messages are received. The interface may calculate updated rankings including the additional conversations and re-render the tiled selector that allows the user to efficiently review the messages. A count of remaining unread conversations may be updated to reflect the insertion. In another embodiment, insertions may be disabled/delayed until after all of the conversations have been labeled read/unread. Because the initial stack of tiles may be displayed for the user along with a count of the number of messages to review, the user may focus on achieving the goal of reviewing that number of unread messages. Continually adding new messages to the stack may frustrate a user. In this embodiment, when the user completes their review of unread messages, a summary message may be displayed informing the user that additional unread messages have arrived. The message may include a count of additional messages and link to review the additional unread messages that routes the user back to a new stack of tiles for marking read/unread to start the process anew. An updated ranking of the newly arrived messages and a new tiled selector may be displayed for the user at that point.

A further technical benefit may be realized by allowing users to further refine the stack of tiles by sorting and filtering. Despite the best efforts of the mobile interface to order the stack of tiles in a manner that meets a user's expectations, the user may have an alternative goal in mind. For example, the user may want to refine the messages being reviewed—e.g., limit the tiles to their DMs or messages on a particular channel. The user may want to sort the tiles in a different order than the order generated by the rankings engine, e.g., by time-stamp, by channel, etc.

A further technical benefit may be realized by displaying a summary of the unread messages with the tiled selector. Or the summary may be displayed before displaying the tiled selector. The summary may inform the user of how many conversations remain that have unread messages. The mobile interface may also predict how many minutes the user will take to triage all of the tiles based on past activity and display this information in the summary.

A further technical benefit may be realized by building a generative pre-trained transformer (GPT) prompt comprising the plurality of conversations having one or more unread messages, sending the GPT prompt to a trained neural network, receiving a summary of unread messages from the neural network, and displaying the GPT-generated summary of the unread messages in the mobile interface before/while displaying the tiled selector.

A further technical benefit may be realized by transitioning to a reward state when a user reviews all of the tiles in the stack of tiles. For example, when the user completes a final swiping action to mark the last conversation in the stack of tiles as read/unread, a congratulatory animation may be displayed for the user with words of encouragement and pleasing audio. This further encourages a user to complete triaging in the mobile interface prior to returning to a desktop interface.

Figure 1:
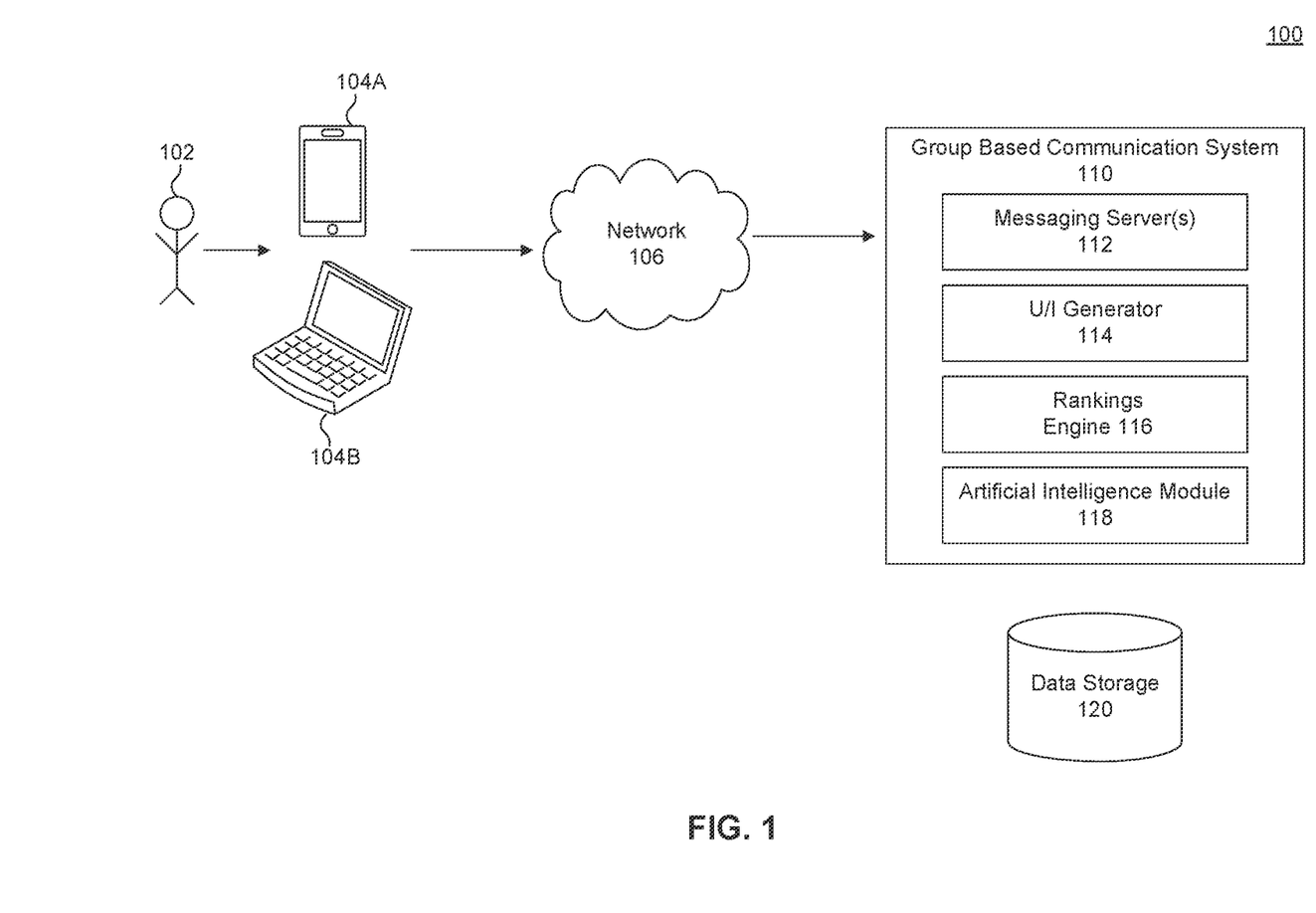
FIG. 1 is a block diagram of an environment for implementing an improved mobile interface, according to some embodiments.

FIG. 1 is a block diagram of environment 100 for implementing an improved mobile interface, according to some embodiments. As illustrated in FIG. 1, environment 100 may include user 102, mobile device 104A, desktop device 104B, network 106, and group-based communication system 110.

User 102 may be an individual using a messaging application. User 102 may be a member of a business, organization, or other suitable group. User 102 may be a human being, but user 102 may be an artificial intelligence construct. User 102 may be tracked with a unique identifier and may login to a messaging application using appropriate credentials. User 102 may also be associated with at least one group identifier representing the workspace(s) that user 102 is a member of. The group identifier may be a 64-bit, unsigned integer and represented externally as a base-34 encoded string. For example, by default, user 102 may be associated with a #general group. By being in the #general group, user 102 may view messages posted to #general by any other member of the group. Similarly, user 102 may post messages to #general viewable by the other members of the group. User 102 may associated with a variety of other groups representing working groups in an organization, groups of friends, family groups, etc. User 102 may create groups on an ad hoc basis within the messaging application. User 102 may also be able to send and receive DMs to and from other users of the messaging application.

Mobile device 104A may be a smart phone, mobile phone, personal digital assistant, netbook, tablet, smart watch or other wearable, appliance, part of the Internet-of-Things, and/or embedded system, to name a few non-limiting examples, or any combination thereof. Although mobile device 104A is illustrated in the example of FIG. 1 as a single computer, one skilled in the relevant arts will understand that mobile device 104A may represent two or more computers in communication with one another. Therefore, it will also be appreciated that any two or more components of mobile device 104A may similarly be executed using some or all of the two or more computers in communication with one another. Mobile device 104A may have a messaging application client tool or installed on the device or particular client-side components required by a messaging application. In another embodiment, mobile device 104A may connect to a messaging application via network 106 via a web-browser or other appropriate software tool. Because mobile device 104A may have a smaller screen relative to desktop device 104B and different input capabilities, mobile device 104A may receive/access a version of the messaging application that generally adheres to a mobile application design methodology. Such a version may provide features related to triaging and completing actions in a comparatively shorter session. Such a version of the messaging application will be referred to below as a mobile interface.

Desktop device 104B may be a desktop computer, workstation, laptop or notebook computer, netbook, tablet, appliance, part of the Internet-of-Things, and/or embedded system, to name a few non-limiting examples, or any combination thereof. Although desktop device 104B is illustrated in the example of FIG. 1 as a single computer, one skilled in the art(s) will understand that desktop device 104B may represent two or more computers in communication with one another. Therefore, it will also be appreciated that any two or more components of desktop device 104B may similarly be executed using some or all of the two or more computers in communication with one another. Desktop device 104B may have a messaging application client tool or installed on the device or particular client-side components required by a messaging application. In another embodiment, desktop device 104B may connect to a messaging application via network 106 via a web-browser or other appropriate software tool. Because desktop device 104B may have a larger screen than mobile device 104A and different input capabilities, desktop device 104B may provide/access a version of the messaging application that generally adheres to the desktop application design methodology and specialize in providing capabilities related to longer periods of focused work. Such a version of the messages application interface components will be referred to below as a desktop interface.

Network 106 may be any network or combination of networks including the Internet, a local area network (LAN), a wide area network (WAN), a wireless network, a cellular network, or various other types of networks as would be appreciated by a person of ordinary skill in the art.

Group-based communication system 110 may provide a communications environment or feed that displays messages posted by validated users. Some messages may be viewable only to the members of a group (private messages) while other messages may be viewable anyone in an organization (public messages). Group-based communication system 110 may provide a desktop interface of the messaging application that adheres to a desktop interface design methodology to user 102 when user 102 accesses the messaging application from desktop device 104B. Group-based communication system 110 may provide a mobile interface of the messaging application that adheres to a mobile interface design methodology to user 102 when user 102 accesses the messaging application from mobile device 104A. Group-based communication system 110 may support file sharing, @mentions, and voice/video calls, integrate with other software tools, and provide a wide range of ancillary features. Group-based communication system 110 may include a variety of modules and systems to provide these user interfaces and messaging-related functionalities including messaging server(s) 112, user interface generator 114, rankings engine 116, and artificial intelligence module 118 and data storage 120.

Messaging server(s) 112 may facilitate transmission of electronic messages between and among client devices associated with users. Messaging server(s) 112 may employ IRC or another suitable application layer protocol to facilitate message exchanges. Messaging server(s) 112 may receive electronic data from various sources, including, but not limited to, mobile device 104A and desktop device 104B, via network 106 using TCP, UDP, or other suitable transport protocol. In an embodiment, messaging server(s)

112 may include one or more servers processing web-based traffic and HTTP or HTTPS request methods as received from a client-side software tool or web browser. In an embodiment, messaging server(s) 112 formulate and return appropriate web responses to mobile device 104A and/or desktop device 104B via similar protocols in accordance with methods that would be known to one skilled in the relevant arts.

User interface generator 114 may be employed by group-based communication system 110 to render user interfaces for user 102. User interface generator 114 may create a mobile interface that adheres to mobile design principles when user 102 access the messaging application from mobile device 104A. User interface generator 114 may create a desktop interface that adheres to desktop design principles when user 102 accesses the messaging application from desktop device 104B. User interface generator 114 may create appropriate templates, stylesheets, etc. to realize these interfaces. These components may be generated server-side and transmitted to the devices, generated on the clients using appropriate techniques, or compiled using a hybrid of these two approaches. In an embodiment, user interface generator 114 may provide client-side libraries that control dynamic interactions between user 102 and the messaging application by performing client-side functionality while periodically communicating with messaging server(s) 112.

In particular, user interface generator 114 may provide an improved mobile interface for reviewing unread messages that displays conversations having unread messages as a stack of tiles. Each tile in the stack corresponds to a conversation having an unread message. The conversation may be a channels, DMs, thread, or other conversation having at least one unread message. With the top tile displayed, a user may efficiently mark the conversation as read or unread by swiping left or right. User interface generator 114 then moves to the next tile in the stack, allowing a user to quickly and efficiently triage unread messages while in the mobile interface.

User interface generator 114 may also generate/provide a desktop interface that displays a list of conversations, channels, threads, etc., on the left of the screen in a frame or region. A user may click a conversation to engage with, and then have the conversation of interest display in a centered location in the screen. The messaging application may track the conversations having unread messages that the user has not viewed. The desktop interface may inform the user about the number of conversations having unread messages and list the conversations for selection by the user. When the user employs the mobile interface tiled selector to mark messages as read/unread, the desktop interface becomes decluttered, requiring less managerial work for the user.

Rankings engine 116 may be employed by group-based communication system 110 to determine an appropriate order of the tiles to display to user 102 when user 102 reviews unread messages. When displaying the stack of tiles, rankings engine 116 may decide the first tile to display, the second tile to display, etc. In an embodiment, rankings engine 116 may engage artificial intelligence module 118 (discussed below) to intelligently intuit an order of conversations desired by user 102. Rankings engine 116 may consider details of the conversations such as whether the conversation occurs on a one-to-many communication channel or a one-to-one direct messaging channel, whether the conversation occurs on a public communication channel or a private communication channel, a side-bar order generated and displayed in a desktop interface, details of the conversation such as the time-stamp of the unread messages and the participants in the group, and the content of the message such as whether a message is marked urgent and/or contains other keywords.

Artificial intelligence module 118 may employ a trained neural network or other suitable other artificial intelligence construct. Artificial intelligence module 118 may train this construct with signals received over time from user 102 to build an artificial intelligence that ranks conversations having unread messages for deployment in the stack of tiles. Such signals include the amount of time a user spends reviewing a message, the amount of or length of replies entered by the user, the nature of the individuals in the channels including the titles positions of users in the group as inferred or imported from an organizational chart, or a frequency of interaction with the sender. When generating the rankings, artificial intelligence module 118 may retrieve characteristics for each conversation in the plurality of conversations. Artificial intelligence module 118 may then receive or create a query specifying the characteristics of the current messages and query the trained artificial intelligence to derive meaningful conclusions about the importance of the individual conversations. Such characteristics may include a time spent, a frequency of an action taken, a position of a sender in an organizational chart, an inferred importance from a title, a frequency of interaction with a sender, and other suitable characteristics.

Artificial intelligence module 118 may also generate a summary of unread messages for displaying in the mobile interface and/or desktop interface. Towards this end, artificial intelligence module 118 may build an appropriate generative pre-trained transformer (GPT) prompt that includes a part or all of the unread messages and conversations. The GPT prompt may be a GPT-3, GPT-4, or other suitable GPT model. For example, the prompt may read "Generate a summary of two or three sentences of the following messages" and then append the unread messages. This GPT prompt may be sent to a trained neural network that generates and returns a summary of unread messages. This summary of unread messages may be displayed in the mobile interface prior to the marking of messages as read/unread in the tiled selector.

Data storage 120 may be any of a panoply of data storage systems housing information relevant to, used in, and stored by group-based communication system 110 including user information, messages, artificial intelligence constructs employed by the system, etc. For instance, data storage 120 may include a database management system or relational database tool and associated components. Data storage 120 may further be a message queue or stream processing platform such as Apache Kafka or Apache Spark or other data storage systems like Apache Hadoop, HDFS, or Amazon S3, to name just some examples. Data storage 120 may be a data lake, data silo, semi-structured data system (CSV, logs, xml, etc.), unstructured data system, binary data repository, or other suitable repository.

FIGS. 2A-2F are example screen display of a mobile interface of a messaging application, according to some embodiments.

Figure 2A:
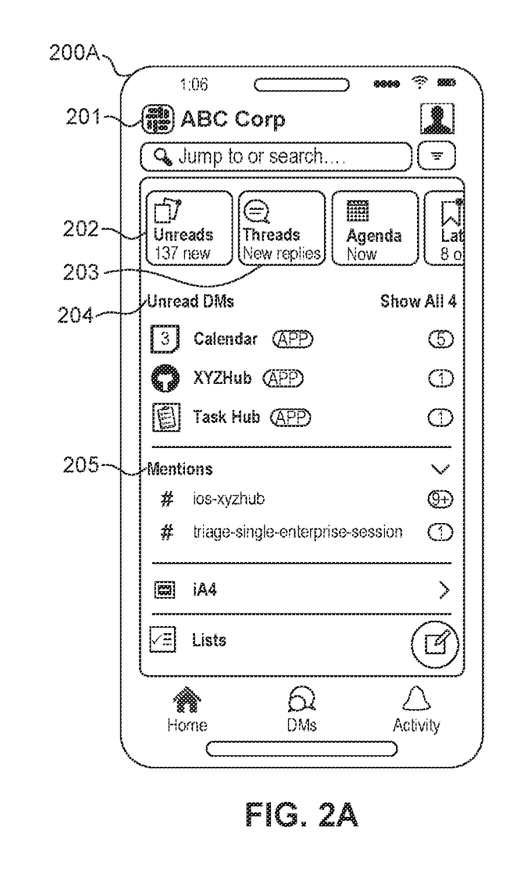
FIGS. 2A-2F are example screen display of a mobile interface of a messaging application, according to some embodiments.

Screen display 200A displays a mobile interface of a messaging application. Screen display 200A represents a main page displayed by the messaging application as provided by group-based communication system 110 and/or user interface generator 114. The screen display provided in screen display 200A is merely exemplary, and one skilled in the relevant art(s) will appreciate that many approaches may be taken to provide a suitable screen display 200A in accordance with this disclosure. As illustrated in FIG. 2A, screen display 200A may include messaging application 201, unread button 202, threads button 203, direct messages 204, and mentions 205.

Messaging application 201 may allow users within an organization to exchange messages. Messages may be text or voice. Messaging application 201 may support file sharing, @mentions, and voice/video calls, integrate with other software tools, and provide a wide range of ancillary features. Messaging application 201 may present a mobile interface designed to be run on/by mobile device 104A that adheres to mobile design methodologies. Messaging application 201 may store user information about user 102 that tailors the experience uniquely for the user. For example, user 102 may be a part of certain channels.

Unread button 202 may be a link to view the unread messages across all conversations that user 102 is a member of. In an embodiment, unread button 202 may route the user to mobile interface components that allow the user to quickly and effectively triage unread messages, as discussed below with reference to FIGS. 2B-2F. In an alternative embodiment, a user may be routed to the tiled selector for reviewing unread messages upon opening the application, without having to click unread button 202.

Threads button 203 may provide user 102 with access to view threads. Threads generally may provide an alternative form of conversation. Threads may limit the amount of information in conversations that appears for all users. For example, information in a thread may only be viewable/accessible by the original poster.

Direct messages 204 may be a subsection or link to a page to display one-to-one DMs sent and received by user 102. DMs may in some instances be sent to multiple users, that is, a DMs may still be a one-to-many message. However, DMs are typically smaller conversations (e.g., less than 8 individuals) that happen outside of devoted channels.

Mentions 205 may display conversations in which the user 102 has been @mentioned. An @mention is a technique in a messaging application for getting a particular user's attention. By typing the @ key, the writer may then type the name of another user in the messaging application or select a particular user from a prefilled list. This provides users with a method of bringing the attention of a particular, single user to the message. Messages having @mentions relevant to the viewing user may be displayed distinctly from other messages in both the desktop interface and mobile interface.

Figure 2B:
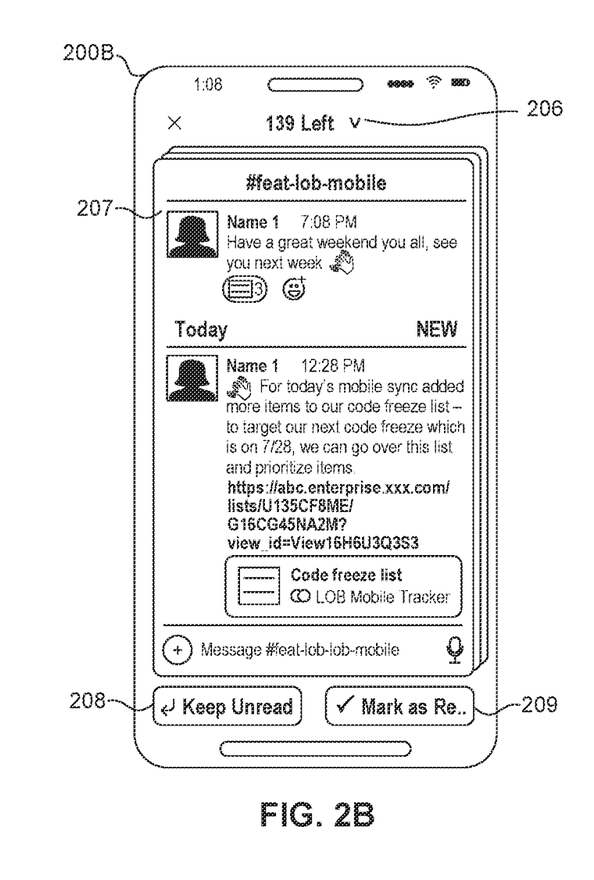

Screen display 200B illustrates an approach to displaying conversations having unread messages as a stack of tiles. Screen display 200B may be a landing page that displays conversations having unread messages. With the top tile displayed, a user may efficiently mark the conversation as read or unread by swiping left or right. The interface then moves to the next tile in the stack. The screen display provided in screen display 200B is merely exemplary, and one skilled in the relevant art(s) will appreciate that many approaches may be taken to provide a suitable screen display 200B in accordance with this disclosure.

Number of unreads 206 may display a number of conversations left to review. The number of conversations left to review may reflect: (1) all conversations having an unread message; or (2) a running count of messages left to review in the tiled selector. For the first approach, the count may reflect the total number of conversations having an unread message, including DMs, channels, and threads. As a consequence, if a user swipes to the left to leave a message as unread, the count may not change. The count may change in response to a user employing the filtering mechanisms discussed in further detail below. For the second approach, in another embodiment, number of unreads 206 may provide a running count of the number of unread messages reviewed of those initially loaded in the tiled selector. In other words, a count may be taken when the user loads the tiled selected that reflects the total number of unread messages. Or a user may select to review a certain amount of messages in a session, e.g., 100 unread conversations. As the user slides left/right triaging the messages, the count may be decremented appropriately. As additional messages arrive while the user is reviewing the messages, the count may not change because the count reflects the number of messages to review in that session. The example provided in screen display 200B lists 139 as the number of unread messages. While this may seem like a large number of messages to review, the review may be accomplished quickly and efficiently by receiving a swiping action from the user that indicates whether the message is to be marked read or left unread, as discussed below with reference to FIGS. 2C-2F.

Message 207 may be the text of a message displayed in the tiled selector. User 102 may scroll up and down in message 207 in the mobile interface to view the full conversation. User 102 may reply to the message using text or a voice recorded message, upload attachments, etc. As illustrated in FIG. 2B, the user may be visually presented with an indication that additional messages remain to be reviewed after message 207. That is, message 207 may displayed as the top tile in a stack of tiles, with additional tiles to follow being visible to the user.

In some embodiments, keep unread button 208 may provide an alternative method of triaging a message by keeping it unread. User 102 may tap keep unread button 208 in addition to swiping left to leave the message marked as unread.

In some embodiments, mark as read button 209 may provide an alternative method of triaging a message by marking it read. User 102 may tap mark as read button 209 in addition to swiping right to mark the message as read.

Figure 2C:
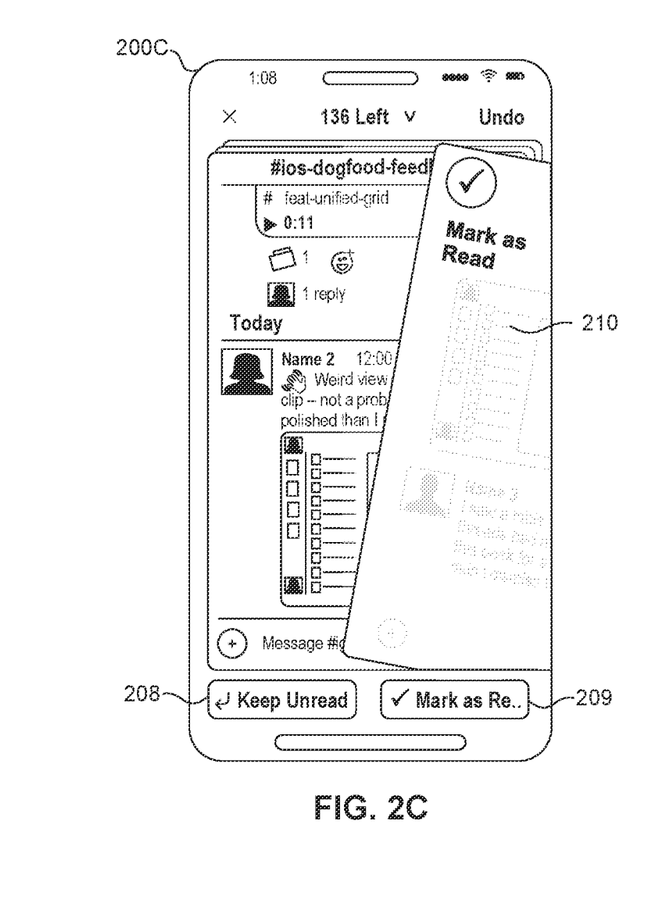

Screen display 200C illustrates a user in the act of sliding the top tile in the displayed tiles to the right. This act marks a conversation corresponding to the top tile as read. The screen display provided in screen display 200C is merely exemplary, and one skilled in the relevant art(s) will appreciate that many approaches may be taken to provide a suitable screen display 200C in accordance with this disclosure.

Marked read animation 210 may display as the user slides a message to the right. The act of tapping and sliding to the right may set an appropriate flag associated with the message and/or conversation to mark that the conversation has been read by the user. Marked read animation 210 may display at this point to exemplify the marking as read. For example, marked read animation 210 may use color or sound to cue the user that the action is taking place. For example, marked read animation 210 may display in green as the user slides to the right and then click when the user has slid the tile far enough to mark as read. An "undo button" may be provided in the mobile interface so that user 102 may quickly roll back this change, i.e., if the user marks a message as read, the undo button will unmark the message as read and return the message to the list of unread messages for later review.

Figure 2D:
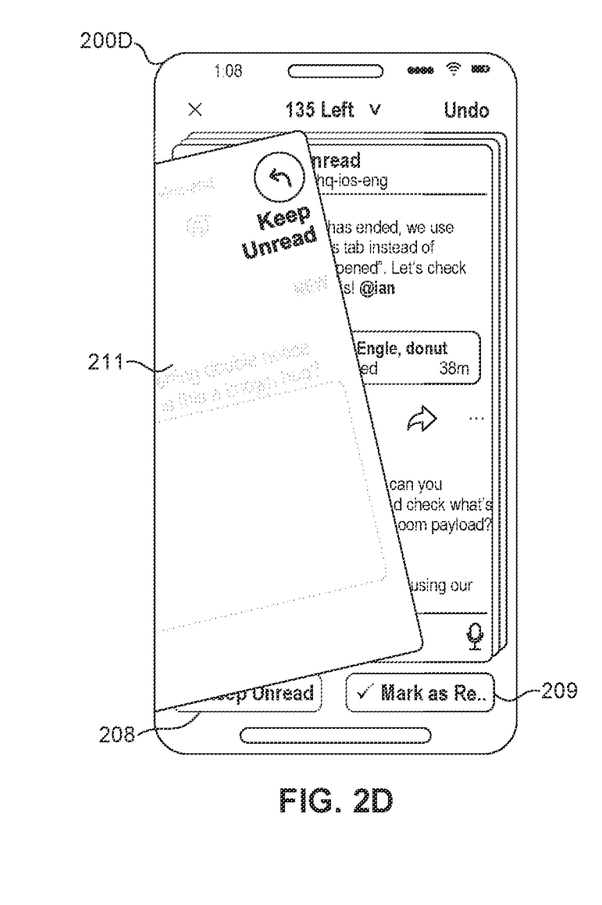

Screen display 200D illustrates a user in the act of sliding the top tile in the displayed tiles to the left. This act may mark a conversation corresponding to the top tile as unread (or just leave the conversation marked as unread). The screen display provided in screen display 200D is merely exemplary, and one skilled in the relevant art(s) will appreciate that many approaches may be taken to provide a suitable screen display 200D in accordance with this disclosure.

Marked unread animation 211 may display as the user slides a message to the left. The act of tapping and sliding to the left may set an appropriate flag associated conversation to mark that the message has unread. Alternatively, the act of sliding to the left may leave a message as unread where this is the default state of messages. Marked unread animation 211 may use color or sound to cue the user that the action is taking place. For example, marked read animation 211 may display in red as the user slides to the left and then click when the user has slid the tile far enough to confirm the action. An undo button may be provided in the mobile interface so that user 102 may quickly roll back this change, i.e., if the user marks a message as unread, the undo button may return the message to the list of unread messages for later review.

Figure 2E:
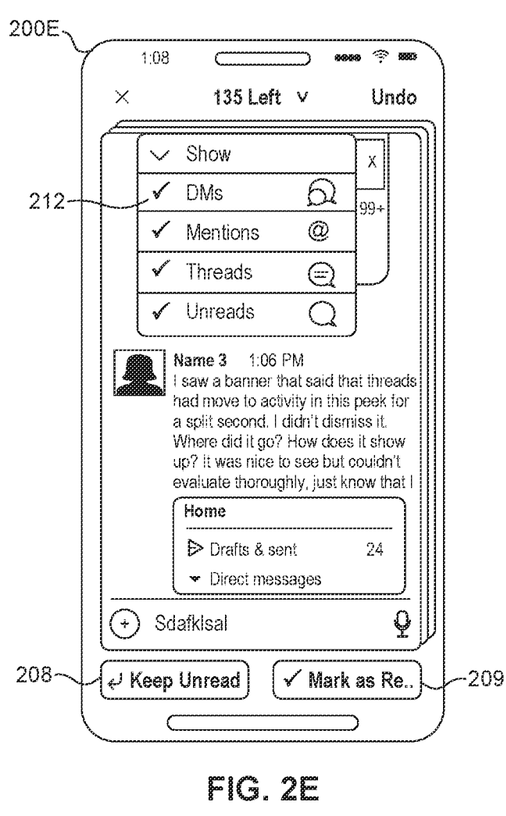

Screen display 200E illustrates filtering mechanisms in the mobile interface. The screen display provided in screen display 200E is merely exemplary, and one skilled in the relevant art(s) will appreciate that many approaches may be taken to provide a suitable screen display 200E in accordance with this disclosure.

Filter 212 may allow user 102 to filter and refine the messages displayed in the tiled selector. For example, messages may be filtered to display only DMs, messages where a user was @mentioned, relevant threads, unread conversations, or a combination of these selections. Other suitable filtering mechanisms may be provided using filter 212 within the scope of this disclosure.

Figure 2F:
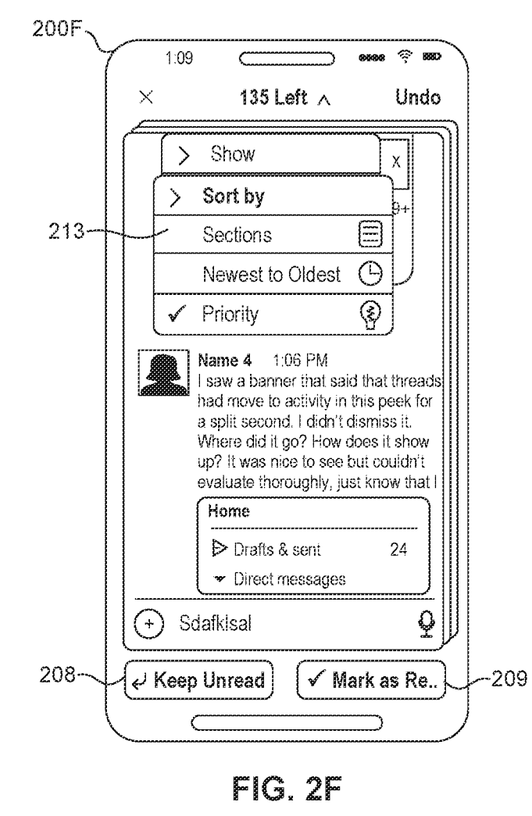

Screen display 200F illustrates sorting capabilities in the mobile interface. The screen display provided in screen display 200F is merely exemplary, and one skilled in the relevant art(s) will appreciate that many approaches may be taken to provide a suitable screen display 200F in accordance with this disclosure.

Sort 213 may allow user 102 to sort the ranking of the tiled selector. For example, messages may be sorted from newest to oldest, by an artificially intelligently generated priority, by section, or by other suitable field. Other suitable filtering mechanisms may be provided using sort 213 within the scope of this disclosure.

Figure 3:
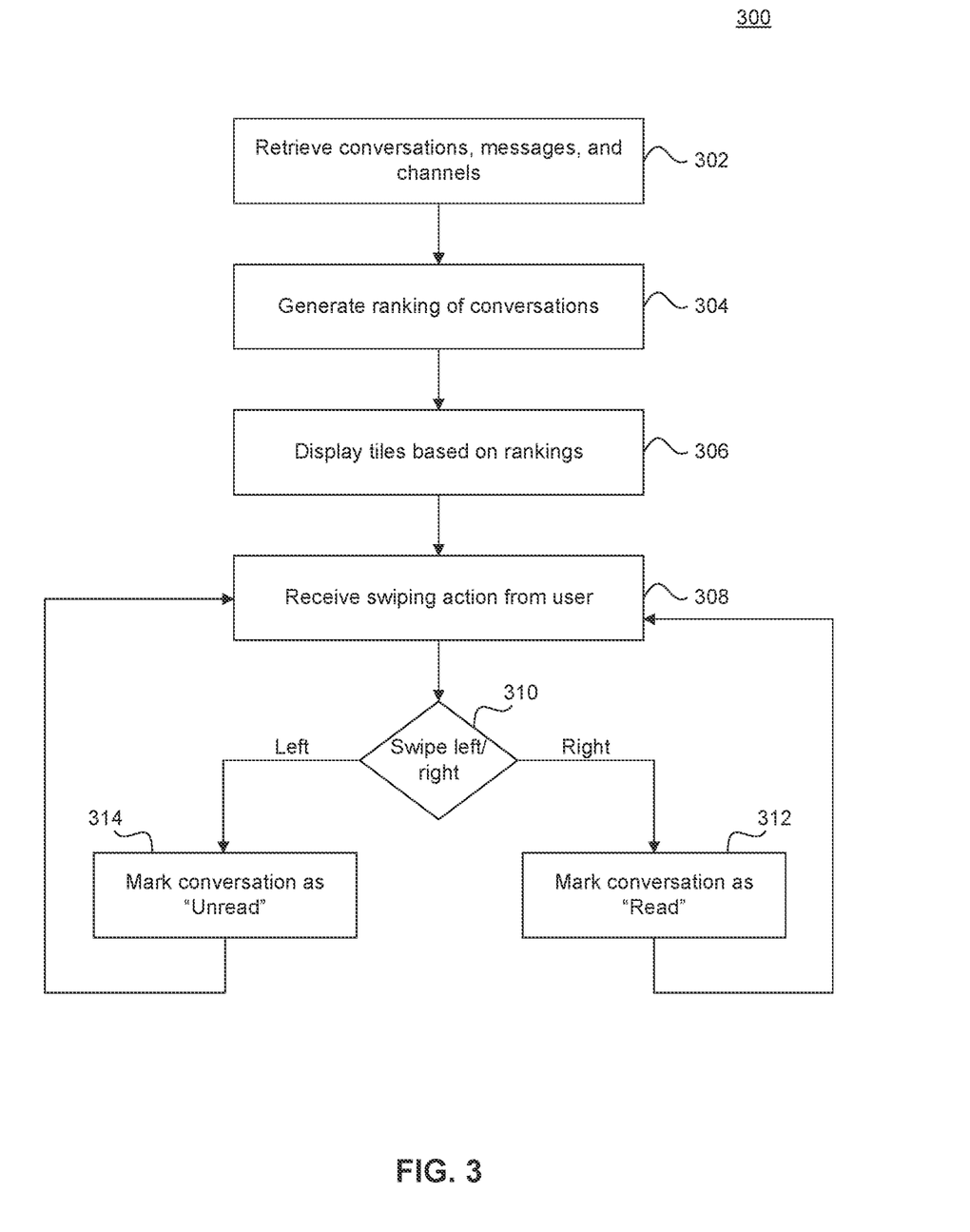
FIG. 3 illustrates a method of providing a mobile interface that allows users to efficiently review unread messages, according to some embodiments.

FIG. 3 illustrates a method 300 of providing a mobile interface that allows users to quickly and efficiently review unread messages, according to some embodiments. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, group-based communication system 110 may retrieve conversations having unread messages across channels, DMs, threads, and other suitable locales for a particular user. A channel may represent a working group of individuals organized around a project, topic, team, or other common goal. Group-based communication system 110 may retrieve the messages in response to user 102 entering a page to review unread messages. Such a page may be a landing page when a user initially loads the messaging application in the mobile interface or a page displayed after a user selects an appropriate link or menu item to review unread messages in a mobile interface generate for mobile device 104A. Messages may be one-to-one or one-to-many messages. In an embodiment, each message may be associated with data indicating whether user 102 has viewed the message. In another embodiment, the view flag may be associated with the channel, DM, thread, or other conversation. When a new message is transmitted in a channel, this flag may be reset to "unread," zero, or other suitable value to track that the channel has an unread message. This tracking may occur on a per-user basis. By limiting retrieved conversations using this flag, group-based communication system 110 may retrieve only those conversations having messages that user 102 has not yet viewed.

In 304, group-based communication system 110 and/or rankings engine 116 may generate a ranking of the conversations having unread messages retrieved in 302. That is, when displaying the stack of tiles, rankings engine 116 may decide the first tile to display, the second tile to display, etc. In one approach, rankings engine 116 may examine details of the conversations such as: (1) whether the conversation is a DM versus a channel, (2) whether the conversation includes any @mentions involving user 102, (3) whether the conversation occurs on a one-to-many communication channel or a one-to-one direct messaging channel, (4) whether the conversation occurs on a public communication channel or a private communication channel, (5) a pre-generated side-bar order generated previously generated for display in the desktop interface, (5) time-stamps of the unread messages, (6) participants in the group or channel including inferred or known relationship(s) between other group members and the current user, (7) whether a message is marked urgent or includes other language indicative of importance or urgency, (8) whether external users (e.g., at a different organization or company) are part of the conversation, (9) the characteristics of devices used by users in the conversation, and (10) other suitable factors. Rankings engine 116 may consider a blend of the foregoing factors with certain factors being weighted higher than others to intelligently rank the tiles.

In an embodiment, rankings engine 116 may engage artificial intelligence module 118 (discussed below) to intelligently infer an order of conversations beneficial to the viewing user in particular. The trained artificial intelligence may be fed unread messages and conversations to derive an intelligent ranking for displaying the tiles. For example, a particular user may direct their attention more frequently to messages within certain channels, and these channels may be prioritized over other channels in determining the tiles' importance. For another example, the artificial intelligence may be trained based on the user's behavior over time in marking certain messages read/unread. The artificial intelligence may be trained with organization chart data to determine the user's supervisor and/or team members and prioritize messages from these individuals over other messages. In this fashion, rankings engine 116 may derive rankings that mimics the intuition of user 102 in a personalized manner.

In 306, group-based communication system 110 and/or user interface generator 114 may display the tiles based on the rankings generated in 304. User interface generator 114 may displayed a tiled selector that displays unread conversations as a stack of tiles. Each conversation may be represented in a single tile. The tiled selector may allow user 102 to mark a conversation as read or leave it marked unread by swiping left or right. Group-based communication system 110 may also display a count of the number of unread messages initially retrieved in 302. Group-based communication system 110 may distinguish between the number of unread messages initially retrieved against how many that the user has reviewed in this triage session. In other words, the interface may maintain a count of remaining conversations to review in addition to the initial number. User interface generator 114 may display the remaining number of conversations, the total number, or both—e.g., the system may display "X of Y," where X is the count of the message being reviewed and Y is the total number of conversations pulled in 302. User 102 may be able to view the entire contents of the conversation by scrolling up and down.

In 308, group-based communication system 110 may receive a swiping action from the user indicating whether the conversation in the displayed tile should be marked as read or left marked unread. In other embodiments, right and left may be flipped, i.e., a conversation may be marked as read by swiping right or in some other direction. In an alternate embodiment, an input may also be received by tapping or selecting a "mark as read" or "leave unread" button to communicate an action.

In 310, if the swiping action is to the left, then method 300 may proceed to 314. If the swiping action is to the right, then method 300 may proceed to 312.

In 312, group-based communication system 110 may mark the conversation as read. For example, group-based communication system 110 may set a flag associated with the channel or individual messages in the channel to "read," 1, or other suitable value to indicate that user 102 has reviewed the message. This value may reference the particular user (user 102) that is reviewing the message, as one user's actions will not influence another user's read/unread status.

In 314, group-based communication system 110 may mark the conversation as unread. Group-based communication system 110 may perform this step by implication simply by not marking the conversation as read. However, group-based communication system 110 may also track the number of unread messages that have been reviewed in a current session of reviewing unread messages. This value may be appropriately decremented to reflect the progress made by the user in reviewing the messages.

Method 300 then returns to step 308 for user 102 to review the next conversation in the stack of tiles. If the reviewed tile is the last tile in the stack of tiles, then the final swiping action marking the last of the conversations may cause the mobile interface to transition to a reward state. The reward state may display a count of the conversations that the user reviewed, display a pleasing graphic, play calming music or audio, etc.

In an embodiment, the mobile interface may prompt the reviewing user with a message indicating the number of messages that have been received while the user was receiving the stack of tiles. For instance, user interface generator 114 may create a page stating that "X number of messages have been received while you were reviewing unread messages. Would you like to review these messages now?" The page may include a link or button to restart the process by generating a second ranking of these new conversations and displaying a tiled selector for this new set of unread messages.

Figure 4:
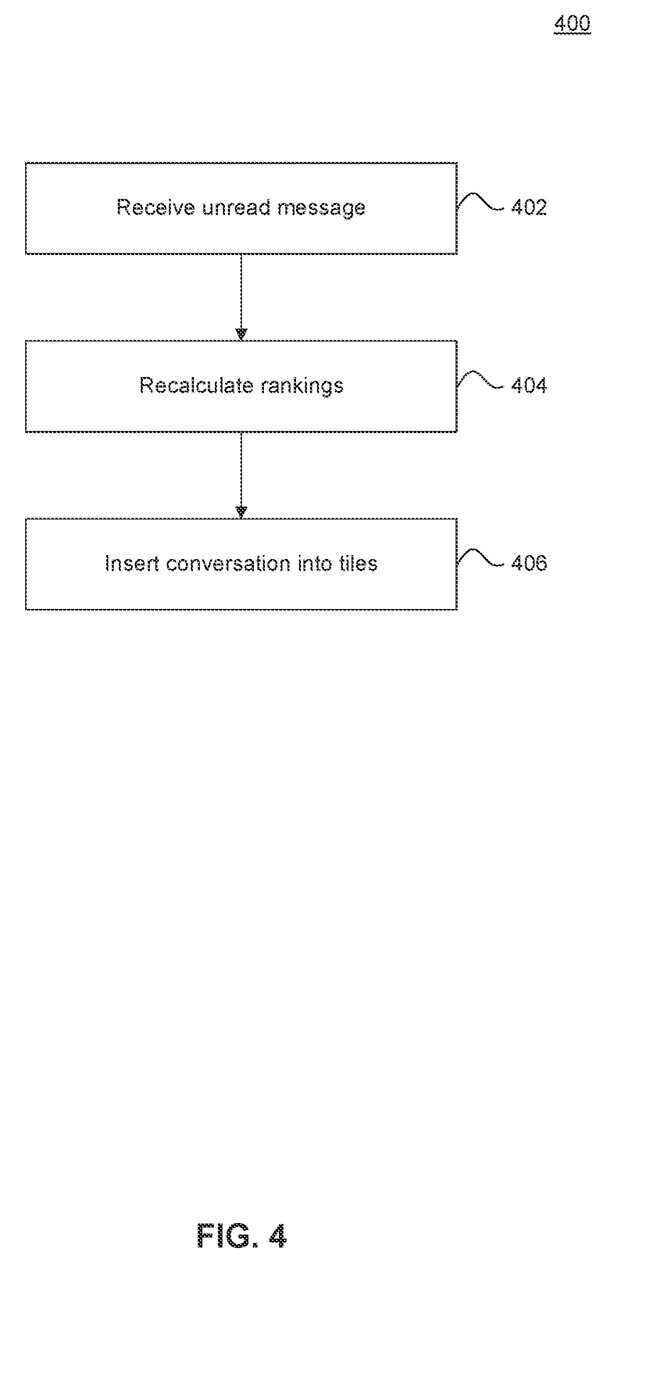
FIG. 4 illustrates a method of providing a mobile interface that performs dynamic insertion of unread messages into a stack of files, according to some embodiments.

FIG. 4 illustrates a method 400 of providing a mobile interface that performs dynamic insertion of unread messages into a stack of files, according to some embodiments. Method 400 may be performed by processing logic that can comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, group-based communication system 110 may cause user 102 to receive an additional message while user 102 is viewing a tiled selector that displays conversations having unread messages as a stack of tiles. For example, a new, unread message may arrive while user 102 is reviewing an originally displayed stack of tiles.

In 404, group-based communication system 110 and/or rankings engine 116 may regenerate the rankings of the tiles in the selector. In one approach, insertions may be disabled/delayed until after all of the conversations have been labeled read/unread. However, rankings engine 116 may also dynamically adjust the rankings and insert a tile corresponding to the updated conversation into the stack. Rankings engine 116 may accomplish this by inserting the updated conversation into the original group of conversations (minus any conversations that have been reviewed, marked as read). Rankings engine 116 may generate a second, updated ranking that includes the updated conversation.

In 406, group-based communication system 110 and/or user interface generator 114 may insert the updated conversation into the tiles dynamically based on the ratings generated in 402. When rankings for the updated conversation are deferred until after all of the unread messages have been reviewed, user interface generator 114 may alternatively display a summary message may be displayed informing the user that additional unread messages have arrived. The message may include a link to review the additional unread messages. If clicked, the user may be presented a new stack of tiles for marking read/unread.

Figure 5:
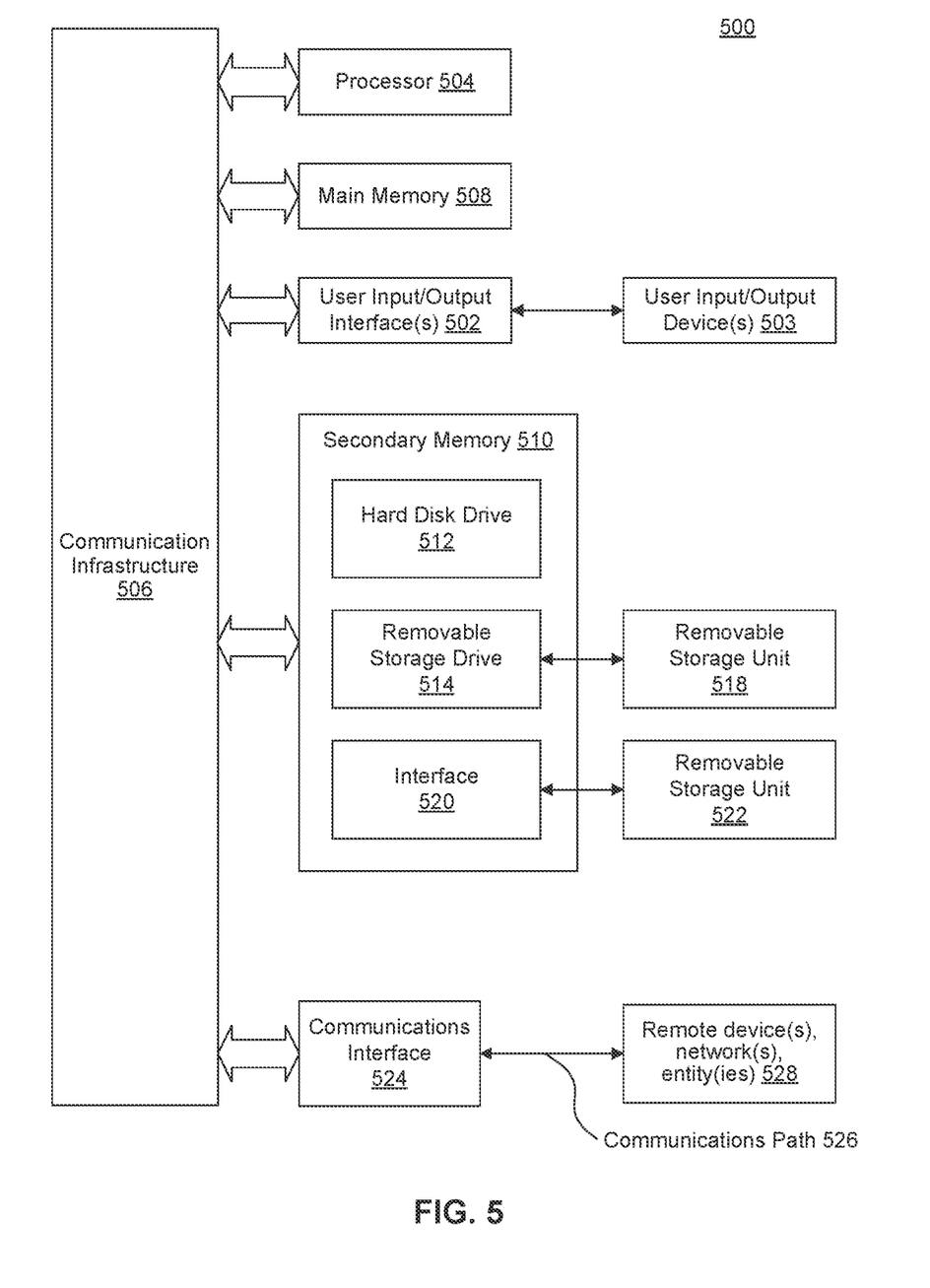
FIG. 5 illustrates a computer system, according to exemplary embodiments of the present disclosure.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LAN, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
generating, by one or more processors, a ranking of a plurality of conversations having one or more unread messages of a messaging application by querying a trained artificial intelligence with a query specifying a frequency of interactions with a sender and a position of the sender in an organization of each conversation in the plurality of conversations;
displaying a plurality of tiles in an order based on the ranking in a mobile interface of the messaging application, wherein a tile in the plurality of tiles represents a conversation in the plurality of conversations; and
responsive to a swiping action in the mobile interface, marking the conversation as read or unread.

2. The method of claim 1, further comprising:
determining an updated conversation, the updated conversation previously having been marked as read; and
inserting an additional tile representing the updated conversation into the plurality of tiles by generating a second ranking using the plurality of conversations and the updated conversation and displaying the plurality of tiles in a second order based on the second ranking.

3. The method of claim 1, further comprising:
determining an updated conversation, the updated conversation previously having been marked as read; and
inserting an additional tile representing the updated conversation into the plurality of tiles at an end of the plurality of tiles.

4. The method of claim 1, further comprising:
tracking a count of updated conversations; and
after receiving a final swiping action marking a final conversation of the plurality conversations as read or unread, displaying a reward state comprising the count of the updated conversations.

5. The method of claim 1, further comprising:
responsive to an undo action received in the mobile interface after the swiping action, marking the conversation as unread.

6. The method of claim 1, wherein the determining the ranking of the plurality of conversations considers whether the conversation occurs on a one-to-many communication channel or a one-to-one direct messaging channel.

7. The method of claim 1, wherein the determining the ranking of the plurality of conversations considers whether the conversation occurs on a public communication channel or a private communication channel.

8. The method of claim 1, wherein the plurality of tiles are displayed on a landing page of the mobile interface.

9. The method of claim 1, wherein the ranking of the plurality of conversations is based on a side-bar order generated and displayed in a desktop interface.

10. The method of claim 1, wherein the ranking of the plurality of conversations is generated based on a time stamp for each conversation in the plurality of conversations.

11. The method of claim 1, further comprising:
building a generative pre-trained transformer (GPT) prompt comprising the plurality of conversations having the one or more unread messages;
sending the GPT prompt to a trained neural network;
receiving a summary of unread messages from the neural network; and
displaying the summary of unread messages.

12. The method of claim 1, the generating the ranking further comprising:
training an artificial intelligence with one or more received signals in a plurality of previously received messages;
retrieving one or more characteristics for each conversation in the plurality of conversations; and
generating the ranking by querying the artificial intelligence with a query including the one or more characteristics for each conversation.

13. A system, comprising:
a memory; and
at least one processor coupled to the memory and configured to:
generate a ranking of a plurality of conversations having one or more unread messages of a messaging application by querying a trained artificial intelligence with a query specifying a frequency of interactions with a sender and a position of the sender in an organization of each conversation in the plurality of conversations;
displaying a plurality of tiles in an order based on the ranking in a mobile interface of the messaging application, wherein a tile in the plurality of tiles represents a conversation in the plurality of conversations; and
responsive to a swiping action in the mobile interface, marking the conversation as read or unread.

14. The system of claim 13, the at least one processor further configured to:
determine an updated conversation, the updated conversation previously having been marked as read; and
insert an additional tile representing the updated conversation into the plurality of tiles by generating a second ranking using the plurality of conversations and the updated conversation and display the plurality of tiles in a second order based on the second ranking.

15. The system of claim 13, the at least one processor further configured to:
determine an updated conversation, the updated conversation previously having been marked as read; and
insert an additional tile representing the updated conversation into the plurality of tiles at an end of the plurality of tiles.

16. The system of claim 13, the at least one processor further configured to:
responsive to an undo action received in the mobile interface after the swiping action, mark the conversation as unread.

17. The system of claim 13, wherein the determining the ranking of the plurality of conversations considers whether the conversation occurs on a one-to-many communication channel or a one-to-one direct messaging channel.

18. The system of claim 13, the at least one processor further configured to:
build a generative pre-trained transformer (GPT) prompt comprising the plurality of conversations having the one or more unread messages;
send the GPT prompt to a trained neural network;

receive a summary of unread messages from the neural network; and display the summary of unread messages.

19. A non-transitory computer-readable device having instructions stored thereon that, when executed by at least one computing device, causes the at least one computing device to perform operations comprising:

generating a ranking of a plurality of conversations having one or more unread messages of a messaging application by querying a trained artificial intelligence with a query specifying a frequency of interactions with a sender and a position of the sender in an organization of each conversation in the plurality of conversations;

displaying a plurality of tiles in an order based on the ranking in a mobile interface of the messaging application, wherein a tile in the plurality of tiles represents a conversation in the plurality of conversations; and responsive to a swiping action in the mobile interface, marking the conversation as read or unread.

20. The non-transitory computer-readable device of claim 19, the operations further comprising:

building a generative pre-trained transformer (GPT) prompt comprising the plurality of conversations having the one or more unread messages;

sending the GPT prompt to a trained neural network;

receiving a summary of unread messages from the neural network; and displaying the summary of unread messages.

* * * * *